(12) United States Patent
Gu et al.

(10) Patent No.: US 11,776,294 B2
(45) Date of Patent: Oct. 3, 2023

(54) METHOD, APPARATUS, COMPUTING DEVICE AND COMPUTER-READABLE STORAGE MEDIUM FOR MONITORING USE OF TARGET ITEM

(71) Applicant: BOE TECHNOLOGY GROUP CO., LTD., Beijing (CN)

(72) Inventors: Yu Gu, Beijing (CN); Tingting Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 108 days.

(21) Appl. No.: 17/486,324

(22) Filed: Sep. 27, 2021

(65) Prior Publication Data

US 2022/0171964 A1    Jun. 2, 2022

(30) Foreign Application Priority Data

Nov. 30, 2020  (CN) .......................... 202011373692.6

(51) Int. Cl.
*G06V 40/10*  (2022.01)
(52) U.S. Cl.
CPC ................................. *G06V 40/107* (2022.01)
(58) Field of Classification Search
CPC .. G06V 40/107; G06V 40/161; G06V 40/169; G06V 40/28; G06V 20/582; G06V 40/172; G06V 40/20; G06V 10/147; G06V 10/16; G06V 10/82; G06V 2201/07; G06V 40/168; G06V 40/174; G06V 40/197; G06V 40/25; G06V 40/19; G06V 20/52; G06V 10/74; G06V 40/23; G06V 10/764; G06V 40/165; G06V 10/145; G06V 10/7715; G06V 2201/03; G06V 40/103; G06V 40/113; G06V 40/45; G06V 40/10; G06V 20/40; G06V 20/46; G06V 10/25; G06V 40/16; G06V 40/11; G06V 20/48; G06V 20/64; G06V 40/70; G06V 10/20; G06V 10/761; G06V 30/36; H04N 21/4728;

(Continued)

(56) References Cited

U.S. PATENT DOCUMENTS

2009/0324008 A1* 12/2009 Kongqiao ............... G06F 3/017
382/103
2013/0051662 A1*  2/2013 Shiozaki ............... G06V 40/161
382/159

(Continued)

*Primary Examiner* — Nimesh Patel
(74) *Attorney, Agent, or Firm* — Myers Bigel, P.A.

(57) ABSTRACT

A method, an apparatus, a computing device, and a computer-readable storage medium for monitoring use of target item are disclosed. The method includes obtaining a RoI of each of video frames, for each frame, determining whether the target item and a head of a monitored target object are both present in the RoI, if yes, determining whether a hand of the monitored target object is present in the RoI, if the hand not present, determining a face orientation of the monitored target object to determining whether the each frame is in a first video frame status, if the hand presents, determining a relative position relationship between the hand and the target item to determining whether the each frame is in the first video frame status, and based on a number of video frames continuously in the first video frame status, determining whether the monitored target object uses the target item.

11 Claims, 7 Drawing Sheets

(58) Field of Classification Search
CPC ............ H04N 21/441; H04N 21/44218; G06F 3/0346; G06F 3/012; G06F 3/013; G06F 3/017; G06F 2218/12; G06F 2203/011; G06F 21/32; G06F 2221/2111; G06F 21/554; G06F 21/552; G06F 3/0304; G06F 3/0481; G06F 18/00; G06F 16/583; G06F 18/2413; G06F 18/24; G06F 18/22; G06F 18/2431; G06F 18/241; G06F 18/23; G06F 18/2411; G06F 3/011; G06F 18/24147; G06F 3/0426; G06F 30/27; G06N 3/04; G06N 20/00; G06N 3/08; G06N 3/045; G06N 3/044; G06N 3/088; G06N 3/02; G06N 3/082; G06N 5/01; G06N 5/025; G06N 3/047; H04W 4/029; H04W 4/021; H04W 4/027; H04W 4/023; H04W 48/08; H04W 48/16; G06T 2207/30201; G06T 7/70; G06T 17/00; G06T 2207/10024; G06T 2207/10036; G06T 2207/20081; G06T 2207/20084; G06T 2207/30196; G06T 7/0012; G06T 7/80; G06T 2200/08; G06T 7/20; G06T 7/73; G06T 2207/10016; G06T 2207/30232; G06T 7/33; G06T 7/292

See application file for complete search history.

(56) References Cited

U.S. PATENT DOCUMENTS

| | | | | |
|---|---|---|---|---|
| 2014/0062861 | A1* | 3/2014 | Yamashita | ............. G06F 3/011 382/103 |
| 2017/0316255 | A1* | 11/2017 | Arata | .................... G06V 40/172 |
| 2020/0250803 | A1* | 8/2020 | Gu | .......................... G06V 20/40 |
| 2021/0056804 | A1* | 2/2021 | Eager | ................... G07F 17/3239 |
| 2021/0201478 | A1* | 7/2021 | Zhang | ................... G06T 7/0012 |

* cited by examiner

METHOD, APPARATUS, COMPUTING DEVICE AND COMPUTER-READABLE STORAGE MEDIUM FOR MONITORING USE OF TARGET ITEM

RELATED APPLICATION

This application claims priority to and the benefit of Chinese Patent Application No. 202011373692.6, filed on Nov. 30, 2020, the content of which is incorporated in its entirety herein by reference.

FIELD

This application relates to the technical field of monitoring video processing, and in particular to a method, an apparatus, a computing device, and a computer-readable storage medium for monitoring the use of a target item.

BACKGROUND

In a related video monitoring system, a human operator is needed to stare at the screen TV wall for a long time. In such an activity, it is very likely that some video information may be missed and huge human resources are wasted. With the development of intelligent video analysis systems, users can set certain specific rules to intelligently identify different items. Also, it can also be identified whether the behavior of a target object conforms to these rules. Once an abnormal situation is found in the monitoring screen, the system can issue an alarm and provide useful information, thereby effectively assisting in dealing with security crises. Alternatively, the abnormal situation can be recorded for subsequent analysis.

However, the current intelligent video analysis systems and methods cannot be directly used in many special detection scenarios (for example, the application scenario where the front desk personnel is monitored and managed), because the accuracy of the detection results of these video analysis systems and methods is low.

SUMMARY

This application provides a method, an apparatus, a computing device, and a computer-readable storage medium for monitoring the use of a target item.

According to an aspect of this application, there is provided a method for monitoring a use of a target item, comprising: obtaining a region of interest of each of video frames in a video to be detected; for said each of the video frames, determining whether the target item and a head of a monitored target object are both present in the region of interest; in response to the target item and the head of the monitored target object being both present in the region of interest, determining whether a hand of the monitored target object is present in the region of interest; in response to the hand of the monitored target object being not present in the region of interest, determining a face orientation of the monitored target object, and based on the face orientation, determining whether said each of the video frames is in a first video frame status, wherein the first video frame status indicates that there is an interaction between the target item and the monitored target object in said each of the video frames; in response to the hand of the monitored target object being present in the region of interest, determining a relative position relationship between the hand and the target item, and based on the relative position relationship, determining whether said each of the video frames is in the first video frame status; based on a number of video frames continuously in the first video frame status, determining whether the monitored target object uses the target item.

In some embodiments, for said each of the video frames, determining whether the target item and the head of the monitored target object are both present in the region of interest comprises: for said each of the video frames, determining whether the target item is present in the region of interest; in response to the target item being present in the region of interest, determining whether the head of the monitored target object is present in the region of interest; in response to the head of the monitored target object being present in the region of interest, determining that the target item and the head of the monitored target object are both present in the region of interest.

In some embodiments, for said each of the video frames, determining whether the target item and the head of the monitored target object are both present in the region of interest further comprises: in response to the target item being not present in the region of interest, determining that said each of the video frames is in a second video frame status, wherein the second video frame status indicates that there is no interaction between the target item and the monitored target object in said each of the video frames; or in response to the head of the monitored target object being not present in the region of interest, determining that said each of the video frames is in the second video frame status.

In some embodiments, determining the relative position relationship between the hand and the target item, and based on the relative position relationship, determining whether said each of the video frames is in the first video frame status comprises: determining an area of an overlapping region between a position of the hand and a position of the target item; in response to the area of the overlapping region being greater than or equal to a preset overlapping threshold, determining that said each of the video frames is in the first video frame status; in response to the area of the overlapping region being smaller than the preset overlapping threshold, determining the face orientation of the monitored target object, and based on the face orientation, determining whether said each of the video frames is in the first video frame status.

In some embodiments, determining the face orientation of the monitored target object, and based on the face orientation, determining whether said each of the video frames is in the first video frame status comprises: determining an angle between the face orientation and a direction of the target item relative to the head of the monitored target object; in response to the angle being less than or equal to a preset angle threshold, determining that said each of the video frames is in the first video frame status; in response to the angle being greater than the preset angle threshold, determining that said each of the video frames is in a second video frame status, wherein the second video frame status indicates that there is no interaction between the target item and the monitored target object in said each of the video frames.

In some embodiments, based on the number of the video frames continuously in the first video frame status, determining whether the monitored target object uses the target item comprises: in response to the number of the video frames continuously in the first video frame status reaching a timing start threshold, starting timing a time of interaction between the target item and the monitored target object; in response to a number of video frames continuously in the second video frame status reaching a timing stop threshold, stopping timing the time of interaction between the target item and the monitored target object; in response to the time of interaction between the target item and the monitored target object being greater than or equal to a interaction time threshold, determining that the monitored target object uses the target item.

In some embodiments, the method further comprises: receiving a verification result for verifying whether the monitored target object uses the target item; based on the verification result, adjusting at least one of the timing start threshold, the timing stop threshold, and the interaction time threshold.

In some embodiments, based on the verification result, adjusting at least one of the timing start threshold, the timing stop threshold, and the interaction time threshold comprises: in response to the verification result indicating that the monitored target object that is determined to be using the target item does not use the target item, adjusting at least one of the timing start threshold and the interaction time threshold.

In some embodiments, based on the verification result, adjusting at least one of the timing start threshold, the timing stop threshold, and the interaction time threshold comprises: in response to the verification result indicating that the monitored target object that is determined to be not using the target item uses the target item, adjusting at least one of the timing stop threshold and the interaction time threshold.

According to another aspect of this application, there is provided an apparatus for monitoring a use of a target item, comprising: a region of interest obtaining module, configured to obtain a region of interest of each of video frames in a video to be detected; a target item and head determining module, configured to, for said each of the video frames, determining whether the target item and a head of a monitored target object are both present in the region of interest; a hand determining module, configured to, in response to the target item and the head of the monitored target object being both present in the region of interest, determine whether a hand of the monitored target object is present in the region of interest; a face orientation determining module, configured to, in response to the hand of the monitored target object being not present in the region of interest, determine a face orientation of the monitored target object, and based on the face orientation, determine whether said each of the video frames is in a first video frame status, wherein the first video frame status indicates that there is an interaction between the target item and the monitored target object in said each of the video frames; a relative position relationship determining module, configured to, in response to the hand of the monitored target object being present in the region of interest, determine a relative position relationship between the hand and the target item, and based on the relative position relationship, determine whether said each of the video frames is in the first video frame status; a target item use determining module, configured to, based on a number of video frames continuously in the first video frame status, determine whether the monitored target object uses the target item.

According to another aspect of this application, there is provided a computing device, comprising: a memory configured to store computer-executable instructions; and a processor configured to execute the computer-executable instructions to cause the computing device to perform the method according to any embodiment of this application.

According to another aspect of this application, there is provided a computer-readable storage medium, comprising computer-executable instructions that when executed by a processor of a computing device cause the processor to perform the method according to any embodiment of this application.

DETAILED DESCRIPTION OF THE EMBODIMENTS

Figure 1:
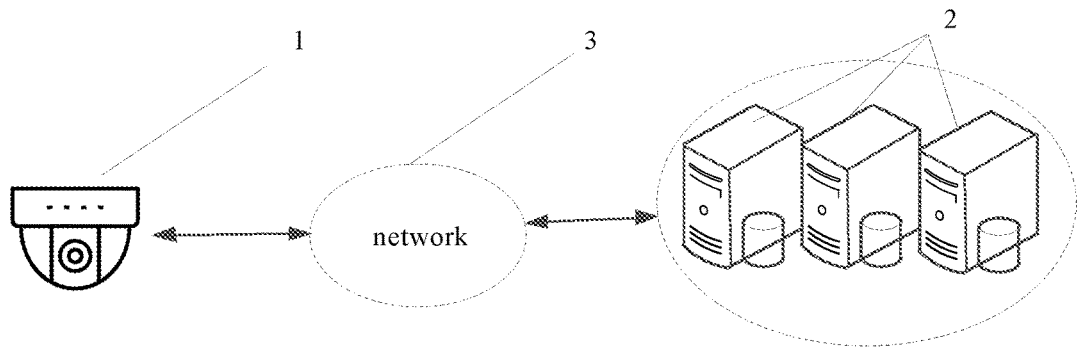
FIG. 1 shows a schematic diagram of an application scenario of a method of monitoring the use of a target item according to an embodiment of the present application.

The application will be further described in detail below with reference to the drawings and embodiments. It can be understood that the specific embodiments described herein are only used for explaining and not for limiting the scope of the present application. In addition, it should be noted that, for ease of description, only the parts that are necessary for understanding the embodiments of the present application are shown in the drawings.

It should be noted that the embodiments in this application and the features in the embodiments can be combined with each other if there is no conflict. Hereinafter, the present application will be described in detail with reference to the drawings and in conjunction with the embodiments.

In related technologies, the methods of monitoring the use of a target item (that is, the methods of detecting whether a monitored target object is using the target item) have problems such as poor operability and low accuracy of detection results. Moreover, these methods are not designed for specific application scenarios, and therefore cannot achieve the purpose of having a higher efficiency for a specific application scenario. For example, these methods are not specifically designed for monitoring the inattentive state of front desk personnel at work (for example, monitoring whether a front desk personnel is using a target item such as a mobile phone at work. The accuracy of the monitoring results of these methods is not high, and the resource consumption of the involved image processor is too large. Therefore, the inattentive state of front desk personnel at work cannot be effectively supervised.

In an aspect of this application, there is provided a method for monitoring the use of a target item, which can effectively monitor the use of the target item by a monitored target object, therefore improve the efficiency of monitoring management, and save labor costs.

Following is an introduction of an exemplary network scenario in which the technical solutions of the embodiments of the present application can be implemented. FIG. 1 schematically shows an application scenario in which the method for monitoring the use of the target item according to an embodiment of the present application can be implemented. As shown in FIG. 1, the network scenario includes an image acquisition device 1 and a server 2. The image acquisition device 1 is electrically connected to the server 2 through a network 3. The image acquisition device 1 may be a circular camera or the like, which is not specifically limited in the embodiments of the present application. The server 2 can be an independent server, a server cluster composed of several servers, or a cloud computing center.

In the embodiments of the present application, the image acquisition device 1 is used to collect image data (for example, the video frame of a video to be detected) within a specified range, and send the image data to the server 2 through the network 3. The server 2 is used to analyze and process the image data sent by the image acquisition device 1, so as to realize the monitoring of (the behavior of) the monitored target object within the specified range. For example, the specified range could be the front desk area of a certain company, the monitored target object could be the front desk personnel of the company, and the behavior that needs to be monitored is the inattentive work of the front desk personnel (for example, the behavior of the personnel playing with a mobile phone).

The method for monitoring the use of a target item according to an embodiment of the present application may be executed by an apparatus for monitoring the use of the target item as the execution subject. The apparatus for monitoring the use of the target item can be integrated into a computing device such as a server or the like. The apparatus for monitoring the use of the target item can be either hardware or software module. The apparatus can be executed by a single server or by several servers that cooperate with each other.

Figure 2:
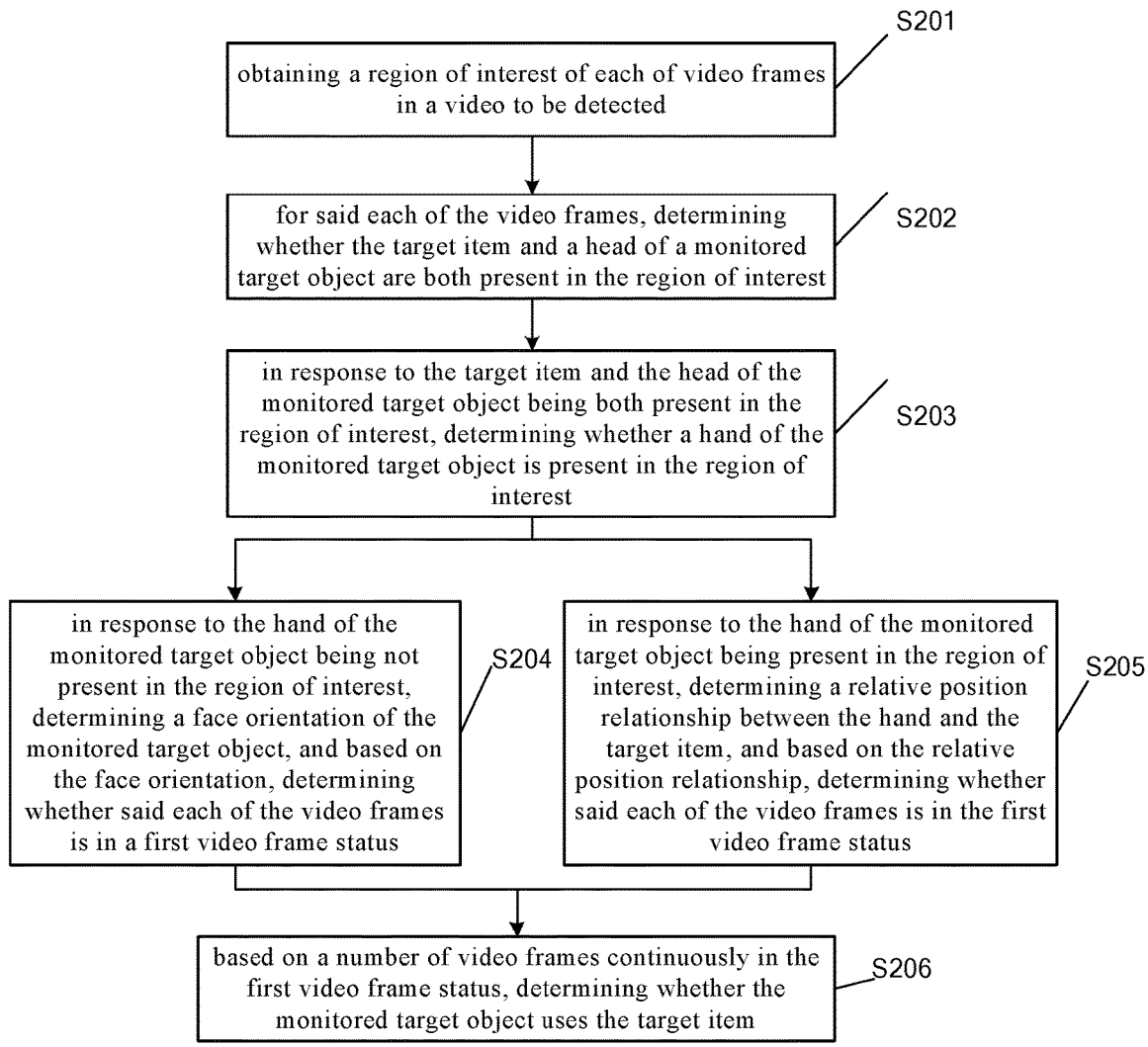
FIG. 2 shows a schematic flowchart of a method for monitoring the use of a target item according to an embodiment of the present application.

FIG. 2 schematically shows a flowchart of a method for monitoring the use of the target item according to an embodiment of the present application. This method can be executed by an apparatus for monitoring the use of the target item, and the apparatus can be configured in a server. The method comprises the steps of:

at step S201, obtaining a region of interest of each of video frames in a video to be detected;
at step S202, for the each of the video frames, determining whether the target item and a head of a monitored target object are both present in the region of interest;
at step S203, in response to the target item and the head of the monitored target object being both present in the region of interest, determining whether a hand of the monitored target object is present in the region of interest;
at step S204, in response to the hand of the monitored target object being not present in the region of interest, determining a face orientation of the monitored target object, and based on the face orientation, determining whether the each of the video frames is in a first video frame status, wherein the first video frame status indicates that there is an interaction between the target item and the monitored target object in the each of the video frames;
at step S205, in response to the hand of the monitored target object being present in the region of interest, determining a relative position relationship between the hand and the target item, and based on the relative position relationship, determining whether the each of the video frames is in the first video frame status;
at step S206, based on a number of video frames continuously in the first video frame status, determining whether the monitored target object uses the target item.

The above steps are described in detail below.

In the above steps, the video to be detected refers to the video data collected from a monitored target object within a specified range. For example, the specified range is the range of a front desk of a company, and the monitored target object is the front desk personnel. In other embodiments, the video to be detected may also be a similar working scenario. The video to be detected can be collected by a camera (e.g., a circular camera) previously installed at a designated detection position.

First, obtain the region of interest of each of the video frames in the video to be detected (step S201). The region of interest (referred to as ROI) contained in each frame of video image (which may also referred to as each of the video frames in the context of this application) in the video to be detected refers to a preset detection region that is set for the target item and the monitored target object under monitoring. In some embodiments, only the image in the region of interest needs to be processed, and images in other regions of the video frame are not processed. This can improve the accuracy of detection and reduce the required computing resources.

After obtaining the region of interest of each frame of the video image of the video to be detected, it can be determined for each of the video frames whether the target item and the head of the monitored target object are both present in the region of interest (step S202). For example, a target item detection model can be used to detect whether a target item exists in the ROI, and a (human) head detection model can be used to detect whether a head of the monitored target object exists in the ROI. The target item includes, but is not limited to, items that are not necessary for general clerical work, such as mobile terminal electronic devices like mobile phones, or items that attract the attention of the staff such as books, newspapers, toys, and the like. Compared to a body detection model, the head detection model can effectively reduce the resource consumption of the image processor.

When it is detected that anyone of the target item and the head of the monitored target object is not present in the region of interest, the detection of the current video frame is ended, and it is determined that this video frame is in a second video frame status. The second video frame status indicates that there is no interaction between the target item and the monitored target object in this video frame. The term "interaction" means the activities such as the monitored target object providing instructions to the target item, or acquiring information provided by the target item, or holding or controlling the target item, or performing similar operations, etc.

When it is detected that both the target item and the head of the monitored target object are presented in the region of interest, the monitor can continues by determining whether the hand of the monitored target object is presented in the region of interest (step S203).

In a specific embodiment of step S202, whether the target item is present in the region of interest (step S2021) may be detected firstly. If the target item is present in the region of interest, then continue to detect whether the head of the monitored target object is present in the region of interest (step S2022). Since the number of video frames in which the target item appears is much smaller than the number of video frames that need to be detected, by first determining whether the target item is present in the region of interest, the detection range can be narrowed down as soon as possible, so that the computing resources required for the subsequent process are greatly reduced. For example, when it is detected that the target item is present in the region of interest, the head detection model is used to detect whether a (human) head is present in the region of interest. If the target item is not present in the region of interest, then stop the detecting of the image frame, and determine that this video frame is in the second video frame status (step S2024). For example, when it is detected that there is no human head present in the region of interest, it is determined that the monitored target object is not present in the region of interest, and the processing of the video image is ended. Based on the detection result of step S2022 as to whether the head of the monitored target object is presented in the region of interest, if the head of the monitored target object does not present in the region of interest, stop the detection on this video frame, and determine that this video frame is in the second video frame status (step S2025). If it is detected that the head of the monitored target object is present in the region of interest, it is determined that the target item and the head of the monitored target object are both present in the region of interest (step S2023), and then continue the operation of determining whether the hand of the monitored target object is presented in the region of interest (step S203). For example, when a human head is detected in the region of interest, it will continue to detect whether there is a human hand in the region of interest. If the hand of the monitored target object is present in the region of interest, then determine the relative position relationship between the hand and the target item. Then, based on the relative position relationship, it may be determined whether the video frame is in the first video frame status (step S205). The first video frame status indicates that there is an interaction between the target item and the monitored target object in the video frame. For example, if there is a human hand in the region of interest, then the position of the human hand is obtained. The position can be the position of the human hand in the video frame, or the position of the human hand in the real world. Then, the relationship between the position of the human hand and the position of the target item may be calculated (for example, the area of the overlapping region between the position of the hand and the position of the target item is determined (step S2051)). The position of the target item (it can also be the position of the target item in the video frame, or the position of the target item in the real world) may be determined after determining the present of the target item in step S2021, or may be determined before determining the relative position relationship between the hand and the target item. When determining the relative position relationship, the same reference coordinate system should be used. According to the relationship between the position of the human hand and the position of the target item, it can be determined whether the monitored target object interacts with the target item. For example, if the area of the overlapping region is greater than or equal to a preset overlapping threshold, it is determined that the video frame is in the first video frame status (step S2052). The area of the overlapping region being greater than or equal to the preset overlapping threshold indicates that the monitored target object is holding the target item or operating the target item, and therefore the video frame recording the scene is in the first video frame status. If the area of the overlapping region is less than the preset overlapping threshold, continue to detect the face orientation of the monitored target object, and based on the face orientation, determine whether the video frame is in the first video frame status (step S2053).

In some embodiments, after the detection in step S203, it is also possible to obtain a result that the hand of the monitored target object is not present in the region of interest. If the hand of the monitored target object does not present in the region of interest, determine the face orientation of the monitored target object, and based on the face orientation, determine whether the video frame is in the first video frame status (step S204). For example, if the face of the monitored target object faces the target item, the corresponding video frame is considered to be in the first video frame status. If the face of the monitored target object does not face the target item, the corresponding video frame is considered to be in the second video frame status.

In addition, as mentioned above, after the detection in step S205, the relative position relationship between the hand and the target item can be determined. In some embodiments, based on the detection result of the relative position relationship, it is needed to continue to detect the face orientation of the monitored target object. Therefore, the previous description of detecting face orientation is also applicable to the subsequent operations based on the positional relationship between the monitored target object and the target item.

For example, when it is determined that there is no interaction between the target item and the monitored target object or no human hand is detected in the region of interest, the face orientation in the region of interest can be detected to obtain a detection result on the face orientation information. The detection result of the face orientation information can be an accurate face orientation reflecting the real orientation of the face, or it can be some representative directions. In some embodiments, through a face orientation detection model, the orientation of the human face can be determined as one of the following representative directions: facing left, facing right, facing downward, and facing forward, and so on. The directions specifically referred to by the foregoing representative directions can be specifically set according to the application scenarios. For example, in the scene of monitoring the use of the target item, the human face facing left can refer to the direction of front left 45° on the horizontal plane, or the direction of front left 45° after the horizontal plane is tilted 30°, or any appropriate angle.

Based on at least one of the aforementioned detection results including whether the target item and the head of the monitored target object are both presented in the region of interest, whether the hand of the monitored target object is presented in the region of interest, the relative position relationship between the hand and the target item, and the face orientation, it can be determined whether the video frame is in the first video frame status. Then, based on the number of video frames continuously in the first video frame status, it is determined whether the monitored target object is using the target item (step S206). For example, an alarm threshold condition (which is adjustable) can be previously set, and then determine whether the monitored target object's behavior of using the target item meets the alarm threshold condition. The alarm threshold condition is the time threshold used to trigger an alarm, which is used to determine whether the user's use of the target item exceeds a preset length of time. The alarm threshold condition includes at least a timing start threshold, a timing stop threshold, and an interaction time threshold. When the alarm threshold condition is met, it is determined that the monitored target object has used the target item for too long, so that the behavior of the monitored target object does not meet the relevant regulations. Specifically, if the number of video frames continuously in the first video frame status reaches the timing start threshold, then start to timing the time of interaction between the target item and the monitored target object (step S2061). If the interaction time between the target item and the monitored target object is greater than or equal to the aforementioned interaction time threshold, it is determined that the monitored target object is using the target item (step S2063). The determination of the interaction time can also refer to the second video frame status. For example, if the number of video frames continuously in the second video frame status reaches the timing stop threshold, then stop timing the time of interaction between the target item and the monitored target object (step S2062). This also means that if the number of video frames continuously in the second video frame status does not reach the timing stop threshold, the timing of the interaction time between the target item and the monitored target object is not stopped.

In the embodiments of the present application, the detection accuracy and efficiency are improved by setting the region of interest in advance. In addition, the embodiments of the present application follows a specific detection sequence (for example, first determine whether the target item is presented in the region of interest, and then determine whether the head of the monitored target object is presented in the region of interest, and then determine whether the hand of the monitored target object is presented in the region of interest) to monitor the behavior of the monitored target object using the target item in the specified area, which can effectively improve the detection efficiency and reduce the required computing resources. In addition, the specific detection sequence can improve the detection accuracy the monitored target object's behavior of using the target item. Through the detection of key parts such as the head, hand, and face in the region of interest, the resource consumption of the image processor can be reduced.

Figure 3:
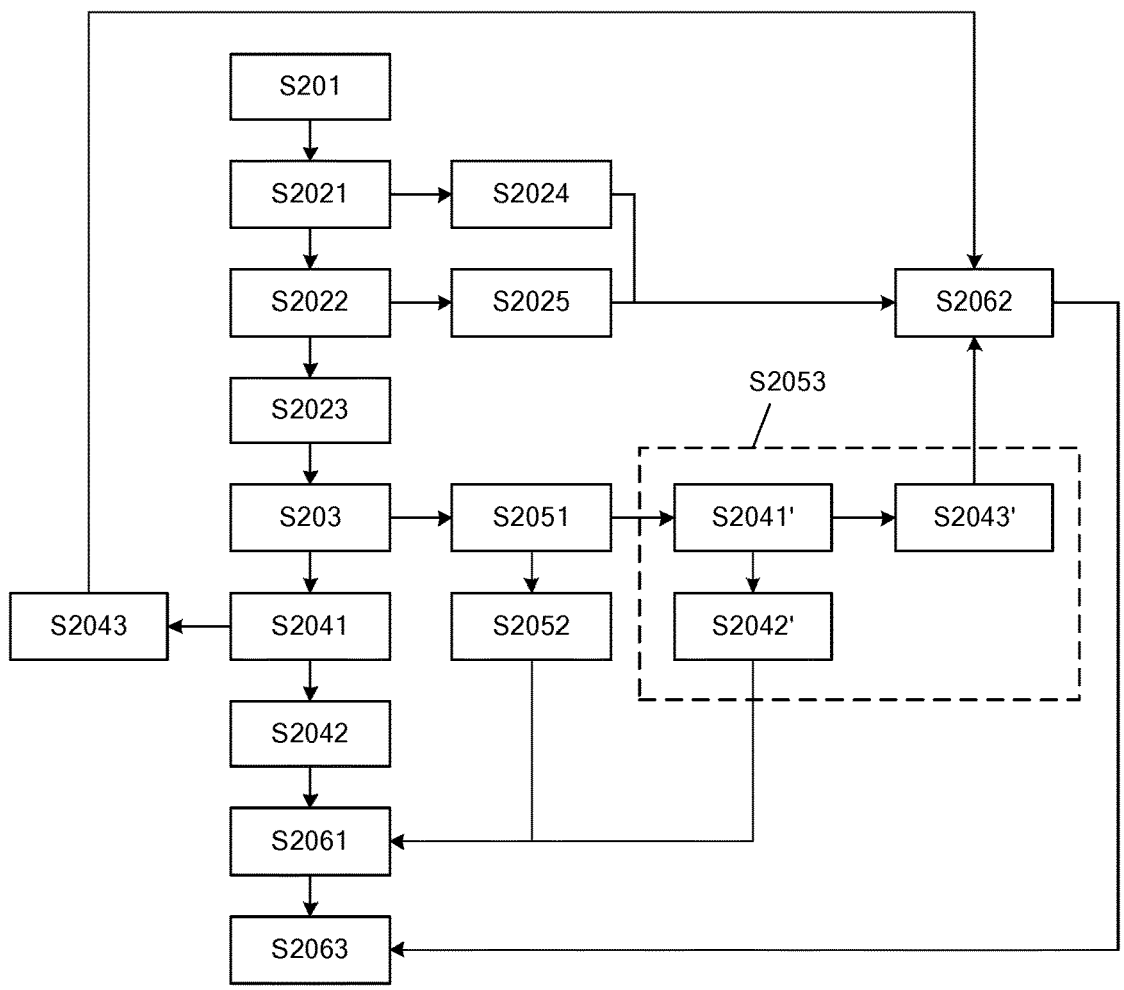
FIG. 3 shows a schematic flowchart of a method for monitoring the use of a target item according to another embodiment of the present application.

FIG. 3 schematically shows a flowchart of a method for monitoring the use of the target item according to another embodiment of the present application. The method may be executed by an apparatus for monitoring the use of the target item, and the apparatus for monitoring the use of the target item may be configured in the server. The method includes the following steps:

first, in step S201, obtaining a region of interest of each of video frames in a video to be detected;

then, in step S2021, for the each of the video frames, determining whether the target item is present in the region of interest.

After the operation of step S2021, two results may be obtained. The first result is that the target item is not present in the region of interest, and the second result is that the target item is present in the region of interest. After the first result of step S2021, in step S2024, in response to the target item being not presented in the region of interest, it is determined that the video frame is in the second video frame status. The second video frame status indicates that there is no interaction between the target item and the monitored target object in the video frame.

After the second result of step S2021, in step S2022, in response to the target item being present in the region of interest, determine whether the head of the monitored target object is present in the region of interest.

After the operation of step S2022, two results may be obtained. The first result is that the head of the monitored target object is not present in the region of interest, and the second result is that the head of the monitored target object is present in the region of interest. After the first result of step S2022, in step S2025, in response to the head of the monitored target object being not present in the region of interest, it is determined that the video frame is in the second video frame status.

After the second result of step S2022, in step S2023, in response to the head of the monitored target object present in the region of interest, it is determined that the target item and the head of the monitored target object are both present in the region of interest.

Then, in step S203, in response to the target item and the head of the monitored target object being both presented in the region of interest, determine whether the hand of the monitored target object is presented in the region of interest.

After the operation of step S203, two results may be obtained. The first result is that the hand of the monitored target object is not present in the region of interest. The second result is that the hand of the monitored target object is present in the region of interest. After the first result of step S203, in step S2041, determine the angle between the face orientation and the direction of the target item relative to the head of the monitored target object.

After the operation of step S2041, two results may be obtained. The first result is that the angle is greater than a preset angle threshold, and the second result is that the angle is less than or equal to the preset angle threshold. After the first result of step S2041, in step S2043, in response to the angle being greater than the preset angle threshold, it is determined that the video frame is in the second video frame status.

After the second result of step S2041, in step S2042, in response to the angle being less than or equal to the preset angle threshold, it is determined that the video frame is in the first video frame status.

Back to the previously discussed two results regarding step S203. After the second result of step S203, in step S2051, determine the area of the overlapping region between the position of the hand and the position of the target item.

After the operation of step S2051, two results may be obtained. The first result is that the area of the overlapping region is greater than or equal to the preset overlapping threshold, and the second result is that the area of the overlapping region is less than the preset overlapping threshold. After the first result of step S2051, in step S2052, in response to the area of the overlapping region being greater than or equal to a preset overlapping threshold, it is determined that the video frame is in the first video frame status.

After the second result of step S2051, in step S2053, in response to the area of the overlapping region being less than the preset overlapping threshold, determine the face orientation of the monitored target object, and based on the face orientation, determine whether the video frame is in the first video frame status.

Step S2053 specifically includes step S2041', step S2042' and step S2043'. In step S2041', the angle between the face orientation and the direction of the target item relative to the head of the monitored target object is determined.

After the operation of step S2041', two results may be obtained. The first result is that then angle is greater than the preset angle threshold, and the second result is that the angle is less than or equal to the preset angle threshold. After the first result of step S2041', in step S2043', in response to the angle being greater than the preset angle threshold, it is determined that the video frame is in the second video frame status.

After the second result of step S2041', in step S2042', in response to the angle being less than or equal to the preset angle threshold, it is determined that the video frame is in the first video frame status.

After that, based on the video frame being in the first video frame status as determined in step S2042, step S2052 and step S2042', in step S2061, in response to the number of video frames continuously in the first video frame status reaching the timing start threshold, start to timing the time of interaction between the target item and the monitored target object. Also, based on the video frame being in the second video frame status as determined in step S2024, step S2025, step S2043 and step S2043', in step S2062, in response to the number of video frames continuously in the second video frame status reaching a timing stop threshold, stop timing the time of interaction between the target item and the monitored target object.

Then, based on at least one of the results of steps S2061 and S2062, in step S2063, in response to the time of interaction between the target item and the monitored target object being greater than or equal to a preset interaction time threshold, determine that the monitored target object is using the target item.

In the above steps, the target item information, the head information, the hand information, and the face orientation information are sequentially detected in the region of interest contained in each of video frames to obtain the detection result of the target item information, the detection result of the head information, the detection result of the hand information, the position relationship between the hand and the target item, and the detection result of the face orientation information. The region of interest can be sequentially input into the detection models for the detection proposes, so as to sequentially obtain the detection result of the target item information, the detection result of the head information, the detection result of the hand information, the position relationship between the hand and the target item, and the detection result of the face orientation information The embodiments of the present application can effectively improve the detection efficiency of the image and ensure the accuracy of the detection result through the preset detection sequence. For example, only when the target item is detected, will the subsequent detections for head, hand, and face orientation be triggered. This can effectively improve the processing efficiency of the image processor, and can be performed on hardware terminals with lower hardware costs.

After obtaining the detection result of the target item information, the detection result of the head information, the detection result of the hand information, the position relationship between the hand and the target item, and the detection result of the face orientation information through the preset detection sequence, analyze the duration of the first video frame status and the second video frame status, in order to accurately determine whether the monitored target object has a long-term use of the target item. The embodiments of the present application can effectively improve the accuracy of the detection result.

In some embodiments, the detection result of hand information includes the position information of the hand. In this case, the process of determining a relative position relationship between the hand and the target item may include determining the area of the overlapping region between the position of the hand and the position of the target item. The process of determining whether the video frame is in the first video frame status based on the relative position relationship may include: in response to the area of the overlapping region being greater than or equal to a preset overlapping threshold, determining that the video frame is in the first video frame status; and in response to the area of the overlapping region being smaller than the preset overlapping threshold, determining a face orientation of the monitored target object, and based on the face orientation, determining whether the video frame is in the first video frame status. That is to say, when the area of the overlapping region is greater than or equal to the preset overlapping threshold, a state value is assigned to the corresponding video frame, which indicates that there is a contact operation between the monitored target object and the target item, such as the monitored target object holding or operating the target item. When the area of the overlapping region is less than the preset overlapping threshold, another state value is assigned to the corresponding video frame, which indicates that there is no contact operation between the monitored target object and the target item.

In the embodiments of the present application, when the target item is detected in the region of interest in the corresponding video image frame, the region of interest is input to a pre-built head detection model, and the output is whether there is a head in the region of interest. If there is no head, the detection of the current video image frame is directly ended, the frame number of the video image frame to be detected is updated, and then the region of interest of the video image frame with the updated frame number is processed. Then, the target item detection is performed on the region of interest of the video image with the updated frame number, and whether to continue the subsequent operation will be determined according to the detection result. In the embodiments of the present application, through the processing of the image area within the specified range (such as the ROI part of the image frame), the range of image processing can be reduced, and the resource consumption of the image processor can be reduced, and the accuracy of the image processing result can be improved at the same time.

If the head is present in the region of interest, the image data of region of interest is input into the pre-built hand detection model to obtain the detection result of whether the hand is present in the region of interest. When it is determined that a hand is present, obtain the hand position information corresponding to the hand, and calculate the overlapping area of the hand and the target item based on the hand position information and the position information of the target item, such as the overlapping area of the orthographic projections of the hand and the target item in the same reference system, and then based on the overlapping area, determine whether the corresponding video frame is in the first video frame status. In other embodiments, the Intersection over Union (IoU) can be calculated according to the hand position information and the position information of the target item to determine whether the corresponding video frame is in the first video frame status. The Intersection over Union is the ratio of the intersection and the union of the rim of the hand position and the rim of the target object.

If the area of the overlapping region is greater than or equal to the preset overlapping threshold for area or the IoU is greater than or equal to the preset overlapping threshold for IoU, it is determined that there is a contact operation between the hand and the target item. At this time, a first state value can be assigned to a state identifier that characterizes whether there is a contact operation between the hand and the target item, and the first state value is used to indicate that there is a contact operation between the hand and the target item. For example, the first state value can be represented by 1 in a binary value, or can be indicated by other numerical identifiers.

If the area of the overlapping region is smaller than the preset overlapping threshold for area or the IoU is smaller than the preset overlapping threshold for IoU, it is determined that there is no contact operation between the hand and the target item. A second state value is assigned to the state identifier that characterizes whether there is a contact operation between the hand and the target item, and the second state value is used to indicate that there is no contact operation between the hand and the target item. For example, the second state value can be represented by 0 in a binary value, or can be indicated by other numerical identifiers. The first state value and the second state value are two different values in the same representing system. For example, when the first state value is 1, the second state value is 0.

The above-mentioned preset overlapping threshold can be set in advance, or it can be obtained according to the artificial intelligence processing method based on the attitude data of the monitored target object.

When the output result of the hand detection model indicates that there is no hand in the region of interest or there is no contact operation between the hand and the target, input the image data of the region of interest into the pre-built the face orientation detection model to obtain the detection result of the face orientation. The result may specifically be whether the human face is facing the target item.

Specifically, through the position information of the target item, the position information of the head of the monitored target object, and the detection result of the face orientation, the angle between the face orientation and the direction of the target item relative to the head of the monitored target object can be determined. Then, whether the monitored target object's line of sight is pointing to the target object can be determined by the magnitude of the angle. When the angle is less than or equal to the preset angle threshold, a state value (for example, binary value 1) is assigned to the state identifier that characterizes whether the face is facing the target item, and the state value is used to indicate that the monitored target object is gazing at the target item. When the angle is greater than the preset angle threshold, another state value (for example, a binary value 0) is assigned to the state identifier that characterizes whether the face is facing the target item, and the other state value is used to indicate that the monitored target object is not gazing at the target item.

The above-mentioned preset angle threshold can be set in advance, or it can be obtained according to the artificial intelligence processing method based the gaze data of the monitored target object.

On the basis of the above embodiments, after obtaining the state identifier that characterizes whether there is a contact operation between the hand and the target item and the state identifier that characterizes whether the face is facing the target item, according to the logical relationship between the two state identifiers, a user state identifier can be further determined. According to the user state identifier, it can be identified whether there is an interaction between the monitored target object and the target item, and by accumulating statistics on the user state identifier, determine whether to start timing the time of interaction between the target item and the monitored target object, and based on the time of interaction, determine whether to give an alarm. The embodiments of the present application can also dynamically adjust at least one of the timing start threshold, the timing stop threshold, and the interaction time threshold, to reduce the possibility of intentional avoidance of monitoring due to the fixed threshold.

The aforementioned user state identifier can be identified by using preset state values. For example, a state value of 1 indicates that there is an interaction between the monitored target object and the target item, and a state value of 0 indicates that there is no interaction between the monitored target object and the target item.

After the accumulating statistics of the user state identifier of each of the video frames, if there are continuous frames which all have the user state identifier of 1, the number of the first state identifier can be counted. When the number of the first state identifier reaches the first statistics threshold (i.e., the timing start threshold), a start timestamp is set. The start timestamp is the beginning of the duration of the state. When the duration of the state is greater than or equal to the interaction time threshold, it is determined that the monitored target object has used the target item for a long time.

If there are continuous frames which all have the user state identifier of 0, the number of the second state identifier can be counted. When the number of the second state identifier reaches the second statistics threshold (i.e., the timing stop threshold), the start timestamp of the duration of state is cleared.

In the embodiments of the present application, the above process is used to decide whether to trigger the timing of the duration the behavior of the monitored target object using the target item to trigger an alarm, which effectively improves the accuracy of the alarm.

Figure 4:
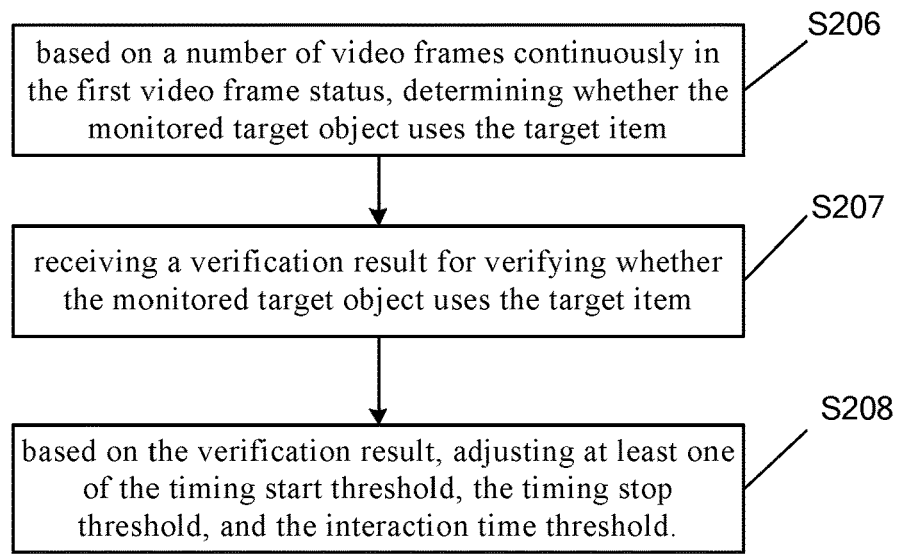
FIG. 4 shows a schematic flowchart of a method for monitoring the use of a target item according to yet another embodiment of the present application.

Further, on the basis of the above embodiments, this application also proposes a method for dynamically adjusting the alarm thresholds of the behavior of the use of the target item. FIG. 4 schematically shows a flowchart of a method for monitoring the use of the target item according to another embodiment of the present application. The method may be executed by the apparatus for monitoring the use of the target item, and the apparatus for monitoring the use of the target item may be configured in the server. This method can be used to adjusted the timing start threshold, the timing stop threshold, and the interaction time threshold involved in step S206 based on the difference between the actual situation of whether the monitored target object is using the target item and the conclusion determined in step S206 on whether the monitored target object is using the target item The method comprises the steps of:
at step S207, receiving a verification result for verifying whether the monitored target object uses the target item;
at step S208, based on the verification result, adjusting at least one of the timing start threshold, the timing stop threshold, and the interaction time threshold.

In the step S206 described above, when the number of video frames continuously in the first video frame status reaches the timing start threshold, the monitoring of the length of time when the monitored target object uses the target item is triggered. When the length of time when the monitored target object uses the target item reaches the interaction time threshold, it is determined that the monitored target object is using the target item. At the same time, the video data within the duration of the using state can be saved to a preset storage location. The monitored target object can feed back whether the detection result is correct, or other personnel can verify the video data in the storage location to verify whether the detection result is correct. The verification result can be transmitted to the apparatus for monitoring the use of the target item. The apparatus receives the verification result for verifying whether the monitored target object is actually using the item.

Then, based on the verification result, adjust at least one of the timing start threshold, the timing stop threshold, and the interaction time threshold.

For example, in some embodiments, when the verification result indicates that the alarm data has errors, the number of the error alarm is accumulated to obtain an alarm accumulation result. Then, when the alarm accumulation result reaches a preset alarm threshold, adjust at least one of the timing start threshold, the timing stop threshold, and the interaction time threshold.

One error is that the monitored target object that is determined to be using the target item actually does not use the target item. This situation may indicate that the timing start threshold is set too short, causing the timing to be triggered by mistake. Or, the interaction time threshold is set too short, so that the normal short-term contact between the monitored target object and the target item is also considered as an interaction that affects the working status. In this case, at least one of the timing start threshold and the interaction time threshold may be adjusted.

Another error is that the monitored target object that actually uses the target item has not been determined to be using the target item. This situation may indicate that the timing stop threshold is set too short, causing the interaction time that should continue to be timed being interrupted, resulting in the clearing of the start timestamp of the interaction state duration. Or, the interaction time threshold is set too long, so that although the interaction time between the monitored target object and the target item does not reach the interaction time threshold, it is already long enough to affect normal work. In this case, at least one of the timing stop threshold and the interaction time threshold may be adjusted.

The embodiments of the present application dynamically adjust the alarm threshold conditions as described above, which can effectively improve the accuracy of alarm data.

Figure 5:
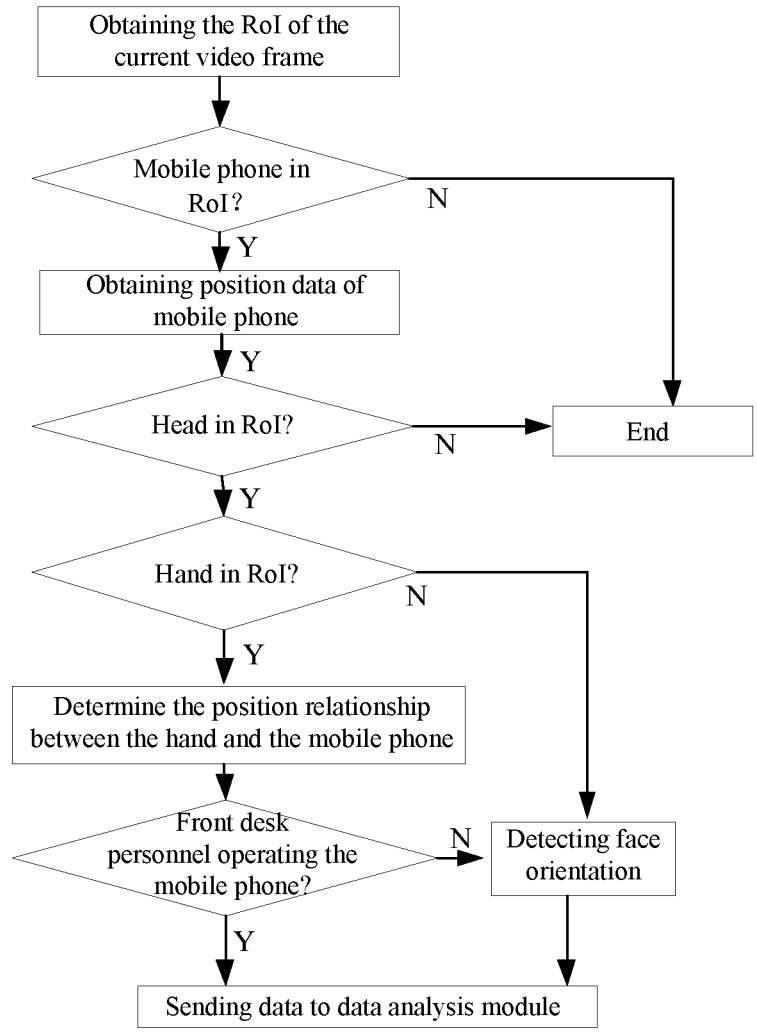
FIG. 5 shows a schematic flowchart of a method for monitoring a behavior of using a mobile phone by front desk personnel according to an embodiment of the present application.
Figure 6:
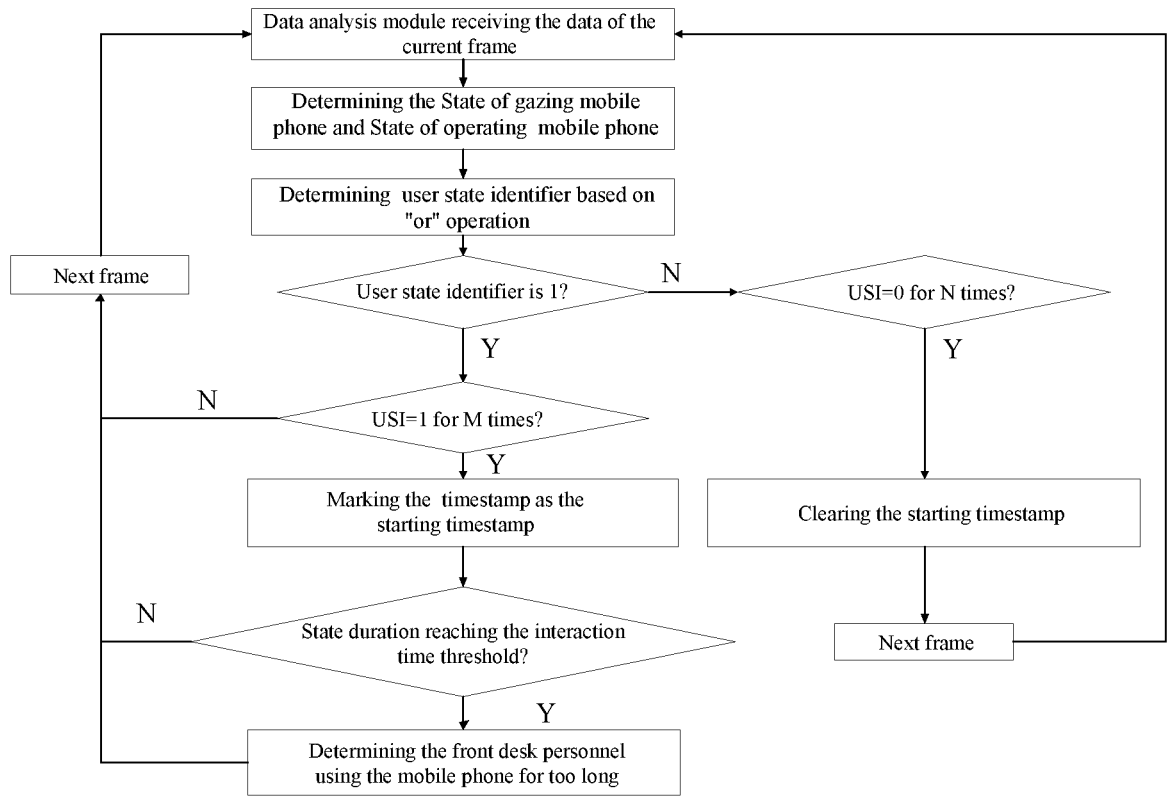
FIG. 6 shows a schematic flowchart of a method for analyzing a monitoring result of a behavior of using a mobile phone by front desk personnel according to an embodiment of the present application.

The following is a further description given in conjunction with FIGS. 5 and 6 taking the monitoring of the behavior of using mobile phone by front desk personnel as an example. FIGS. 5 and 6 schematically show flow charts of the method of monitoring the use of the target item under the above application scenario according to an embodiment of the present application.

In this application scenario, a circular camera is set in the front desk area to collect video in the front desk area. Video frames are obtained by performing frame serialization processing on the collected video. Then, for each of the video frames, obtain the corresponding ROI.

After the ROI is obtained, first, a mobile phone detection model is used to detect whether there is a mobile phone present in the ROI. If not, the detection process of the current video frame is ended. If a mobile phone is present in the ROI, the position information of the mobile phone in the current video frame can be obtained.

Then, a head detection model is used to detect whether a head is present in the ROI. If not, it is determined that nobody is present in the current video frame, and the detection process on the current video frame is ended. If a head is present, continue to use a hand detection model to detect whether there is a hand present in the ROI. If a hand is present, calculate the IoU based on the position of the hand and the position of the mobile phone. If the IoU is greater than or equal to the IoU threshold, it is determined that the front desk personnel is in the state of holding the mobile phone or operating the mobile phone. If no hand is present, or the IoU is less than the IoU threshold, continue to use a face orientation detection model to detect the face orientation in the ROI to determine the face orientation of the front desk personnel. Through the face orientation detection model, the face orientation can be determined as one of following four directions: leftward, rightward, downward, and forward.

After the processing by the above detection models, the mobile phone position data, the head position data, the hand position data, the face orientation data, and the timestamp data of the current frame are obtained. Then, carry out data analysis and processing on these data. The above detection of front desk personnel according to a specific detection sequence can improve the accuracy of the image detection result.

The mobile phone detection model, the head detection model, and the hand detection model can be obtained by training the target detection model through training data. The target detection model includes but is not limited to Yolo model, FasterRCNN model, CenterNet model, etc.

Figure 7:
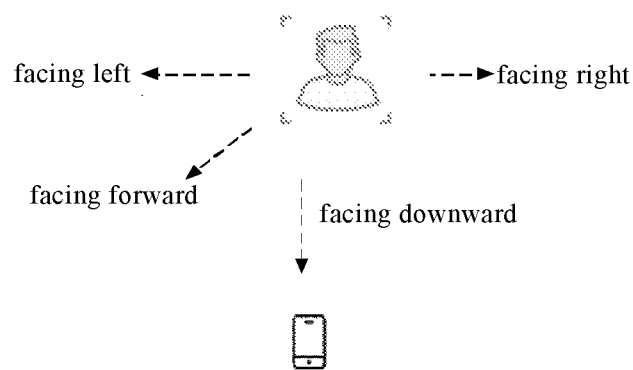
FIG. 7 shows a schematic diagram of the face orientation detection result according to an embodiment of the present application.

The face orientation detection model may include a face detection sub-model and a face orientation classification sub-model. After inputting the RoI to be detected into the face detection sub-model, a face detection result can be obtained. Then, the face detection result is input into the face orientation classification sub-model. The face detection sub-models include but are not limited to the DBFace model, and the face orientation classification sub-models include but are not limited to the Resnet classification model. When constructing the face orientation classification sub-model, a large amount of face data of four or more orientations can be obtained as training data and input into the face orientation classification sub-model to be trained for training. The face data of four orientations includes the face data facing left, right, down, and forward. FIG. 7 schematically shows four the face orientations.

After receiving the mobile phone position data, the head position data, the hand position data, the face orientation data, and the timestamp information of the current video frame, these data of a preset time period of video frames are cumulatively analyzed to determine whether the personnel is using the mobile phone. Accumulative analysis can effectively improve the accuracy of alarm data.

According to the mobile phone position data and the face orientation data, it can be determined whether the front desk personnel's line of sight is looking at the mobile phone. For example, the angle between the face orientation and the line formed by the positions of the head and the phone can be determined by referring to the face orientation detection result. If the angle is less than or equal to the angle threshold, the front desk personnel is determined to be looking at the mobile phone at the current moment.

If the face orientation shows the state of looking at the mobile phone, 1 is used to represent the state. In the counter state, 0 is used.

According to the received state of the contact operation of the mobile phone, the corresponding numerical identifier is used to indicate. For example, if the detection result indicates the front desk personnel is operating the mobile phone, then 1 is used to indicate the state. Otherwise, 0 is used to indicate the state. The results of these states are shown in Table 1 below.

TABLE 1

| State of gazing mobile phone | State of operating mobile phone | Timestamp of current frame |
|---|---|---|
| null | 1 | T1 |
| 1/0 | 0 | T2 |
| 1/0 | null | T3 |

In order to more clearly show the relationship between the front desk personnel and the mobile phone, the user state identifier is obtained by conducting an "or" operation between the state of gazing the mobile phone and the state of operating the mobile phone. For example, for the first timestamp T1, the value of state of operating the mobile phone is 1, then at this situation, there is no need to detect the state of gazing the mobile phone. That is, under the "or" operation, the user state identifier is 1. For another example, for the second timestamp T2, it is determined that the hand is present in the RoI, but the overlap between the hand and the mobile phone is less than the overlapping threshold, then the value of the state of operating the mobile phone is 0. Under this situation, the user state identifier depends on the state of gazing the mobile phone. If the value of the state of gazing mobile phone is 0, the user state identifier is 0. If the value of the state of gazing mobile phone is 1, the user state identifier is 1. For another example, for the third timestamp T3, no hand is detected in the RoI, so the value of the state of operating mobile phone cannot be obtained. Under this situation, the state of operating mobile phone is null. Under this situation, the user state identifier depends on the state of gazing mobile phone. If the value of the state of gazing mobile phone is 0, the user state identifier is 0. If the value of the state of gazing mobile phone is 1, the user state identifier is 1.

If the user state identifiers for M consecutive video frames are 1 and M is greater than or equal to the timing start threshold, then the timing of the state duration will be triggered, and the timestamp at this moment will be marked as the starting timestamp. The number of M and the timing start threshold are used to make statistics on the state of the user using the mobile phone. The value of M is a natural number. In some embodiments, the timing start threshold may be 5.

If the user state identifiers for N consecutive video frames are 0 and N is greater than or equal to the timing stop threshold, then the timing of the state duration will be stopped. The number of N and the timing stop threshold are used to make statistics on the state of the user not using the mobile phone. The value of N is a natural number. In some embodiments, the timing stop threshold may be 2.

If the state duration reaches the interaction time threshold, then it is determined that the front desk personnel is using the mobile phone for too long.

If N is smaller than the timing stop threshold, the timing of state duration will continues and does not stop.

The video data within the state duration is saved to a preset storage region, and then the alarm data is verified according to the stored video data to determine whether the alarm data is correct.

If the alarm data is wrong, the alarm thresholds of the data analysis module can be dynamically corrected. In the embodiments of the present application, the alarm thresholds can be dynamically modified to improve the accuracy of the alarm.

When it is determined that there is wrong recognitions in the alarm data (e.g., the front desk personnel that is determined to be using the mobile phone actually does not use the mobile phone), the number of wrong recognitions is counted. If the count result indicates that the number of wrong recognitions is relatively large, then the interaction time threshold can be increased and/or the timing start threshold can be increased.

When it is determined that there is missing recognitions in the alarm data (e.g., the front desk personnel that is determined to be not using the mobile phone actually does use the mobile phone), the number of missing recognitions is counted. If the count result shows that the number of missing recognitions is relatively large, then the interaction time threshold can be reduced, and/or the timing stop threshold can be increased.

Through the above-mentioned dynamic modification of the alarm thresholds, the embodiments of the application can effectively avoid the problem that the user plays the mobile phone for a short time, but the frequency of playing is high, which effectively improves the accuracy of the alarm.

The flowcharts and block diagrams in the accompanying drawings illustrate the possible implementation architecture, functions, and operations of the methods, devices, and computer program products according to various embodiments of the present application. In this regard, each block in the flowchart or block diagram can represent a module, a program segment, or a part of code. The above-mentioned module, program segment, or part of code contains one or more executable instruction for realizing the specified logic function. It should also be noted that, in some alternative implementations, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagram or flowchart, and the combination of blocks in the block diagram or flowchart, can be implemented by a dedicated hardware-based system that performs the specified functions or operations, or can be implemented by a combination of dedicated hardware and computer instructions.

Figure 8:
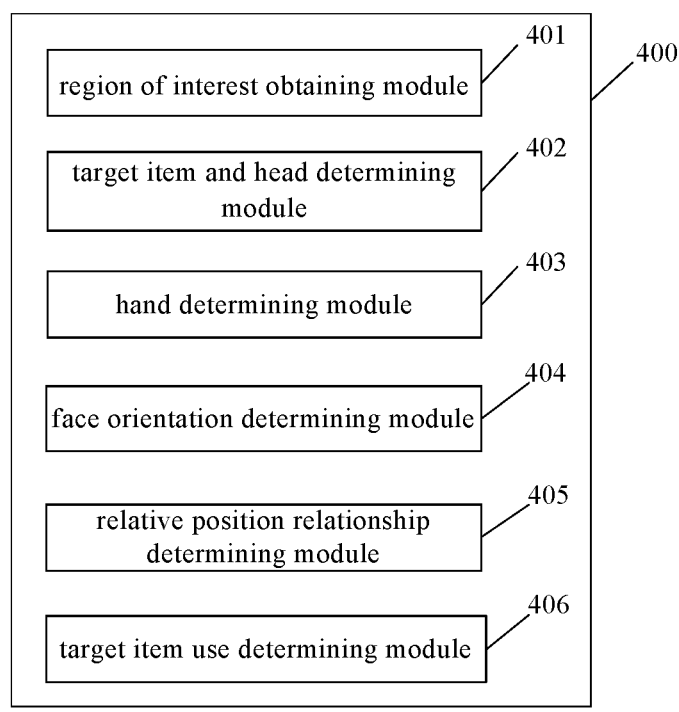
FIG. 8 shows a schematic structural diagram of an apparatus for monitoring the use of a target item according to an embodiment of the present application.

According to another aspect of the present application, there is provided an apparatus for monitoring the use of the target item. FIG. 8 shows a schematic structural diagram of the apparatus for monitoring the use of the target item according to an embodiment of the present application. The apparatus 400 can be configured in a server. In some embodiments, the apparatus 400 comprises:

a region of interest obtaining module 401, configured to obtain a region of interest of each of video frames in a video to be detected;

a target item and head determining module 402, configured to, for the each of the video frames, determine whether the target item and a head of a monitored target object are both present in the region of interest;

a hand determining module 403, configured to, in response to the target item and the head of the monitored target object being both present in the region of interest, determine whether a hand of the monitored target object is present in the region of interest;

a face orientation determining module 404, configured to, in response to the hand of the monitored target object being not present in the region of interest, determine a face orientation of the monitored target object, and based on the face orientation, determine whether the each of the video frames is in a first video frame status, wherein the first video frame status indicates that there is an interaction between the target item and the monitored target object in the each of the video frames;

a relative position relationship determining module 405, configured to, in response to the hand of the monitored target object being present in the region of interest, determine a relative position relationship between the hand and the target item, and based on the relative position relationship, determine whether the each of the video frames is in the first video frame status; and a target item use determining module 406, configured to, based on a number of video frames continuously in the first video frame status, determine whether the monitored target object uses the target item.

In some embodiments, the target item and head determining module 402 is configured to, for the each of the video frames, determine whether the target item is present in the region of interest;

in response to the target item being not present in the region of interest, determine that the each of the video frames is in a second video frame status, wherein the second video frame status indicates that there is no interaction between the target item and the monitored target object in said each of the video frames;

in response to the target item being present in the region of interest, determine whether the head of the monitored target object is present in the region of interest;

in response to the head of the monitored target object being not present in the region of interest, determine that the each of the video frames is in the second video frame status;

in response to the head of the monitored target object being present in the region of interest, determine that the target item and the head of the monitored target object are both present in the region of interest.

In some embodiments, the face orientation determining module 404 is configured to:

determine an angle between the face orientation and a direction of the target item relative to the head of the monitored target object;

in response to the angle being less than or equal to a preset angle threshold, determine that said each of the video frames is in the first video frame status;

in response to the angle being greater than the preset angle threshold, determine that the each of the video frames is in a second video frame status, wherein the second video frame status indicates that there is no interaction between the target item and the monitored target object in said each of the video frames.

In some embodiments, the relative position relationship determining module 405 is configured to, determine an area of an overlapping region between a position of the hand and a position of the target item;

in response to the area of the overlapping region being greater than or equal to a preset overlapping threshold, determine that said each of the video frames is in the first video frame status;

in response to the area of the overlapping region being smaller than the preset overlapping threshold, determine the face orientation of the monitored target object by using the face orientation determining module 404, and based on the face orientation, determining whether said each of the video frames is in the first video frame status.

In some embodiments, the target item use determining module 406 is configured to, in response to the number of the video frames continuously in the first video frame status reaching a timing start threshold, start timing a time of interaction between the target item and the monitored target object;

in response to a number of video frames continuously in the second video frame status reaching a timing stop threshold, stop timing the time of interaction between the target item and the monitored target object;

in response to the time of interaction between the target item and the monitored target object being greater than or equal to a interaction time threshold, determine that the monitored target object uses the target item.

The embodiments of the present application can effectively improve the detection efficiency of the images and ensure the accuracy of the detection result through the preset detection sequence. For example, only when the target object is detected in the RoI, will the subsequent detections for head, hand, and the face orientation be triggered, which can effectively improve the processing efficiency of the image processor and can be performed on hardware terminals with lower hardware costs.

Figure 9:
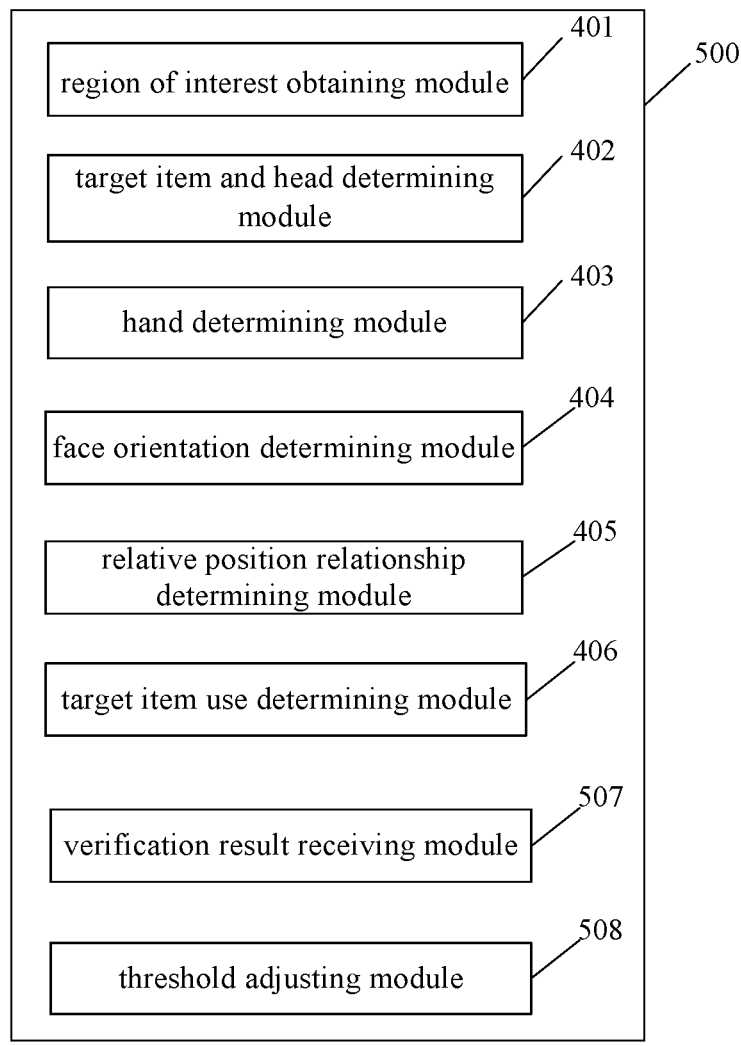
FIG. 9 shows a schematic structural diagram of an apparatus for monitoring the use of a target item according to another embodiment of the present application.

FIG. 9 shows a schematic structural diagram of an apparatus for monitoring the use of the target item according to another embodiment of the present application. The apparatus 500 can be configured in a server. On the basis of the foregoing embodiment, the apparatus 500 comprises:

a region of interest obtaining module 401, configured to obtain a region of interest of each of video frames in a video to be detected;

a target item and head determining module 402, configured to, for the each of the video frames, determine whether the target item and a head of a monitored target object are both present in the region of interest;

a hand determining module 403, configured to, in response to the target item and the head of the monitored target object being both present in the region of interest, determine whether a hand of the monitored target object is present in the region of interest;

a face orientation determining module 404, configured to, in response to the hand of the monitored target object being not present in the region of interest, determine a face orientation of the monitored target object, and based on the face orientation, determine whether the each of the video frames is in a first video frame status, wherein the first video frame status indicates that there is an interaction between the target item and the monitored target object in the each of the video frames;

a relative position relationship determining module 405, configured to, in response to the hand of the monitored target object being present in the region of interest, determine a relative position relationship between the hand and the target item, and based on the relative position relationship, determine whether the each of the video frames is in the first video frame status; and a target item use determining module 406, configured to, based on a number of video frames continuously in the first video frame status, determine whether the monitored target object uses the target item.

In addition, the apparatus 500 also comprises:

a verification result receiving module 507, configured to receive a verification result for verifying whether the monitored target object uses the target item; and a threshold adjusting module 508, configured to, based on the verification result, adjusting at least one of the timing start threshold, the timing stop threshold, and the interaction time threshold.

In some embodiments, the threshold adjusting module 508 is configured to, in response to the verification result indicating that the monitored target object that is determined to be using the target item does not use the target item, adjust at least one of the timing start threshold and the interaction time threshold.

In some embodiments, the threshold adjusting module 508 is configured to, in response to the verification result indicating that the monitored target object that is determined to be not using the target item uses the target item, adjust at least one of the timing stop threshold and the interaction time threshold.

In the above embodiments, the apparatus for monitoring the use of the target item may also include a video saving module for saving the video image corresponding to the state duration in the alarm threshold condition, so as to verify the alarm data, thereby ensuring the accuracy of the alarm data.

Through the above-mentioned dynamic modification of the alarm thresholds, the embodiments of the application can effectively avoid the problem that the user plays the mobile phone for a short time, but the frequency of playing is high, which effectively improves the accuracy of the alarm.

It should be understood that the modules recorded in the above apparatus correspond to the steps in the methods described with reference to FIGS. 2-6. Therefore, the operations and features described above for the methods are also applicable to the above-mentioned apparatus and the modules contained therein, and will not be repeated here. The above-mentioned apparatus may be implemented in a browser or other security application of an electronic device in advance, and may also be loaded into a browser or other security application of an electronic device by downloading or the like. Corresponding modules in the above-mentioned apparatus can cooperate with units in the electronic device to implement the solutions of the embodiments of the present application.

In the several modules or units mentioned in the detailed description above, this division is not mandatory. In fact, according to the embodiments of the present disclosure, the features and functions of two or more modules or units described above may be embodied in one module or unit. Conversely, the features and functions of a module or unit described above can be further divided into multiple modules or units to be embodied.

Figure 10:
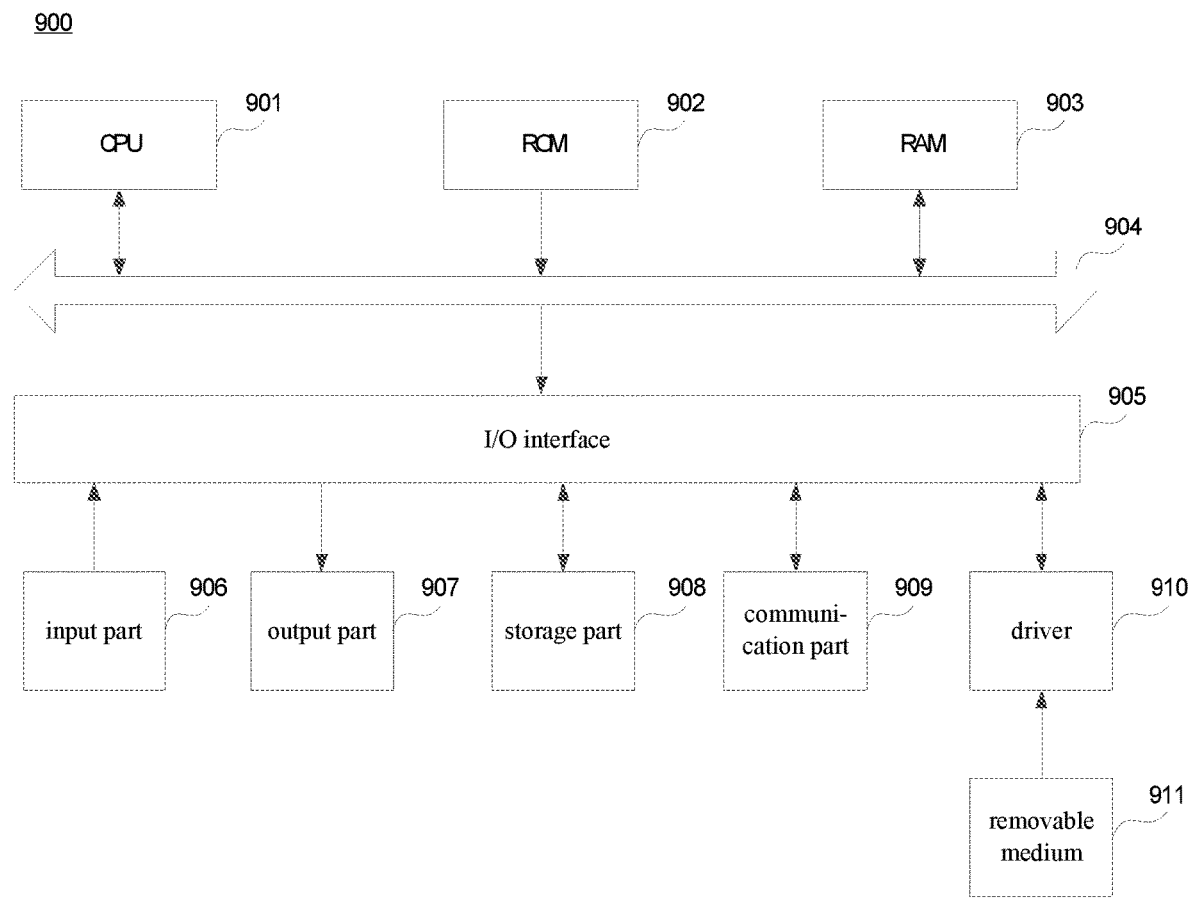
FIG. 10 shows a schematic structural diagram of a processing system of a computing device according to an embodiment of the present application.

Refer to FIG. 10, which shows a schematic structural diagram of a processing system of a computing device provided by an embodiment of the present application.

As shown in FIG. 10, the computer device includes a central processing unit (CPU) 901, which can execute various appropriate actions and processes according to a program stored in a read-only memory (ROM) 902 or a program loaded into a random access memory (RAM) 903 from a storage part 908. In the RAM 903, various programs and data required for system operation are also stored. The CPU 901, the ROM 902, and the RAM 903 are connected to each other through a bus 904. An input/output (I/O) interface 905 is also connected to the bus 904.

The following components are connected to the I/O interface 905: an input part 906 including a keyboard, a mouse, etc.; an output part 907 including a cathode ray tube (CRT), a liquid crystal display (LCD) and a speaker, etc.; a storage part 908 including a hard disk, etc.; and a communication part 909 including a network interface card such as a LAN card, a modem, and the like. The communication part 909 performs communication processing via a network such as the Internet. A driver 910 is also connected to the I/O interface 905 as needed. A removable medium 911, such as a magnetic disk, an optical disk, a magneto-optical disk, a semiconductor memory, etc., is installed on the driver 910 as needed, so that the computer program read therefrom is installed into the storage part 908 as needed.

In particular, according to the embodiments of the present application, the processes described in FIGS. 2-6 above can be implemented as a computer software program. For example, each embodiment of the present application includes a computer program product, which includes a computer program carried on a computer-readable medium, and the computer program includes program code for executing the methods shown in the flowcharts. In such an embodiment, the computer program may be downloaded and installed from the network through the communication part 909, and/or installed from the removable medium 911. When the computer program is executed by the central processing unit (CPU) 901, the above-mentioned functions defined in the system of the present application are executed.

It should be noted that the computer-readable medium in this application may be a computer-readable signal medium or a computer-readable storage medium, or any combination of the two. The computer-readable storage medium may be, for example, but not limited to, an electrical, magnetic, optical, electromagnetic, infrared, or semiconductor system, device, or apparatus, or a combination of any of the above. More specific examples of computer-readable storage media may include, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In this application, the computer-readable storage medium may be any tangible medium that contains or stores a program, and the program may be used by or in combination with an instruction execution system, apparatus, or device. In this application, a computer-readable signal medium may include a data signal propagated in a baseband or as a part of a carrier wave, with a computer-readable program code carried therein. This propagated data signal can take many forms, including but not limited to electromagnetic signals, optical signals, or any suitable combination of the foregoing. The computer-readable signal medium may also be any computer-readable medium other than a computer-readable storage medium that may send, propagate, or transmit the program for use by or in combination with the instruction execution system, apparatus, or device. The program code contained on the computer-readable medium can be transmitted by any suitable medium, including but not limited to: wireless, wire, optical cable, RF, etc., or any suitable combination of the above.

The flowcharts and block diagrams in the accompanying drawings illustrate the possible implementation architecture, functions, and operations of the methods, devices, and computer program products according to various embodiments of the present application. In this regard, each block in the flowchart or block diagram can represent a module, a program segment, or a part of code. The above-mentioned module, program segment, or part of code contains one or more executable instruction for realizing the specified logic function. It should also be noted that, in some alternative implementations, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagram or flowchart, and the combination of blocks in the block diagram or flowchart, can be implemented by a dedicated hardware-based system that performs the specified functions or operations, or can be implemented by a combination of dedicated hardware and computer instructions.

The units or modules involved in the embodiments of the present application can be implemented in software or hardware, and the described units or modules can also be provided in a processor. The names of these units or modules do not constitute a limitation on themselves under certain circumstances. The described unit or module may also be provided in a processor, for example, it may be described as: a processor includes a region of interest obtaining module, a target item and head determining module, a hand determining module, a face orientation determining module, a relative position relationship determining module, and a target item use determining module. The names of these units or modules do not constitute a limitation on the unit or module itself under certain circumstances. For example, the region of interest obtaining module can also be described as "a module for obtaining a region of interest of each of video frames in a video to be detected".

As another aspect, this application also provides a computer-readable medium. The computer-readable medium may be included in the electronic device described in the above-mentioned embodiments; or it may exist alone without being assembled into the electronic device. The aforementioned computer-readable medium carries one or more programs, and when the aforementioned one or more programs are executed by an electronic device, the electronic device realizes the method for monitoring a use of a target item as described in the aforementioned embodiments.

The present application also provides a computer program product or a computer program. The computer program product or computer program includes computer instructions, and the computer instructions are stored in a computer-readable storage medium. The processor of the computing device reads the computer instructions from the computer-readable storage medium, and the processor executes the computer instructions, so that the computing device executes the method for monitoring a use of a target item provided in the various embodiments described above.

The above description is only some embodiments of the present application and only explains the applied technical principles. Those skilled in the art should understand that the scope of this application is not limited to the technical solutions formed by the specific combination of the above technical features, but also covers other technical solutions formed by any combination of the technical features described above and their equivalent features, if not departing from the concept of this application, including, for example, the technical solution formed by exchanging the above-mentioned features with the technical features disclosed in this application with similar functions (but not limited thereto).

We claim:

1. A method for monitoring a use of a target item, comprising:
    obtaining a region of interest of each of video frames in a video to be detected;
    for said each of the video frames, determining whether the target item and a head of a monitored target object are both present in the region of interest;
    in response to the target item and the head of the monitored target object being both present in the region of interest, determining whether a hand of the monitored target object is present in the region of interest;
    in response to the hand of the monitored target object being not present in the region of interest, determining a face orientation of the monitored target object, and based on the face orientation, determining whether said each of the video frames is in a first video frame status, wherein the first video frame status indicates that there is an interaction between the target item and the monitored target object in said each of the video frames;
    in response to the hand of the monitored target object being present in the region of interest, determining a relative position relationship between the hand and the target item, and based on the relative position relationship, determining whether said each of the video frames is in the first video frame status; and
    based on a number of video frames continuously in the first video frame status, determining whether the monitored target object uses the target item.

2. The method according to claim 1, wherein for said each of the video frames, determining whether the target item and the head of the monitored target object are both present in the region of interest comprises:
    for said each of the video frames, determining whether the target item is present in the region of interest;
    in response to the target item being present in the region of interest, determining whether the head of the monitored target object is present in the region of interest; and
    in response to the head of the monitored target object being present in the region of interest, determining that the target item and the head of the monitored target object are both present in the region of interest.

3. The method according to claim 2, wherein for said each of the video frames, determining whether the target item and the head of the monitored target object are both present in the region of interest further comprises:
    in response to the target item being not present in the region of interest, determining that said each of the video frames is in a second video frame status, wherein the second video frame status indicates that there is no interaction between the target item and the monitored target object in said each of the video frames; or
    in response to the head of the monitored target object being not present in the region of interest, determining that said each of the video frames is in the second video frame status.

4. The method according to claim 1, wherein determining the relative position relationship between the hand and the target item, and based on the relative position relationship, determining whether said each of the video frames is in the first video frame status comprises:
    determining an area of an overlapping region between a position of the hand and a position of the target item;

in response to the area of the overlapping region being greater than or equal to a preset overlapping threshold, determining that said each of the video frames is in the first video frame status; and in response to the area of the overlapping region being smaller than the preset overlapping threshold, determining the face orientation of the monitored target object, and based on the face orientation, determining whether said each of the video frames is in the first video frame status.

5. The method according to claim 4, wherein determining the face orientation of the monitored target object, and based on the face orientation, determining whether said each of the video frames is in the first video frame status comprises:

determining an angle between the face orientation and a direction of the target item relative to the head of the monitored target object;

in response to the angle being less than or equal to a preset angle threshold, determining that said each of the video frames is in the first video frame status; and in response to the angle being greater than the preset angle threshold, determining that said each of the video frames is in a second video frame status, wherein the second video frame status indicates that there is no interaction between the target item and the monitored target object in said each of the video frames.

6. The method according to claim 5, wherein based on the number of the video frames continuously in the first video frame status, determining whether the monitored target object uses the target item comprises:

in response to the number of the video frames continuously in the first video frame status reaching a timing start threshold, starting timing a time of interaction between the target item and the monitored target object;

in response to a number of video frames continuously in the second video frame status reaching a timing stop threshold, stopping timing the time of interaction between the target item and the monitored target object; and in response to the time of interaction between the target item and the monitored target object being greater than or equal to an interaction time threshold, determining that the monitored target object uses the target item.

7. The method according to claim 6, further comprising:

receiving a verification result for verifying whether the monitored target object uses the target item; and based on the verification result, adjusting at least one of the timing start threshold, the timing stop threshold, and the interaction time threshold.

8. The method according to claim 7, wherein based on the verification result, adjusting at least one of the timing start threshold, the timing stop threshold, and the interaction time threshold comprises:

in response to the verification result indicating that the monitored target object that is determined to be using the target item does not use the target item, adjusting at least one of the timing start threshold and the interaction time threshold.

9. The method according to claim 7, wherein based on the verification result, adjusting at least one of the timing start threshold, the timing stop threshold, and the interaction time threshold comprises:

in response to the verification result indicating that the monitored target object that is determined to be not using the target item uses the target item, adjusting at least one of the timing stop threshold and the interaction time threshold.

10. A computing device, comprising:

a memory configured to store computer-executable instructions; and a processor configured to execute the computer-executable instructions to cause the computing device to perform the method according to claim 1.

11. A non-transitory computer-readable storage medium, comprising computer-executable instructions that when executed by a processor of a computing device cause the processor to perform the method according claim 1.

* * * * *